Patented Mar. 18, 1941

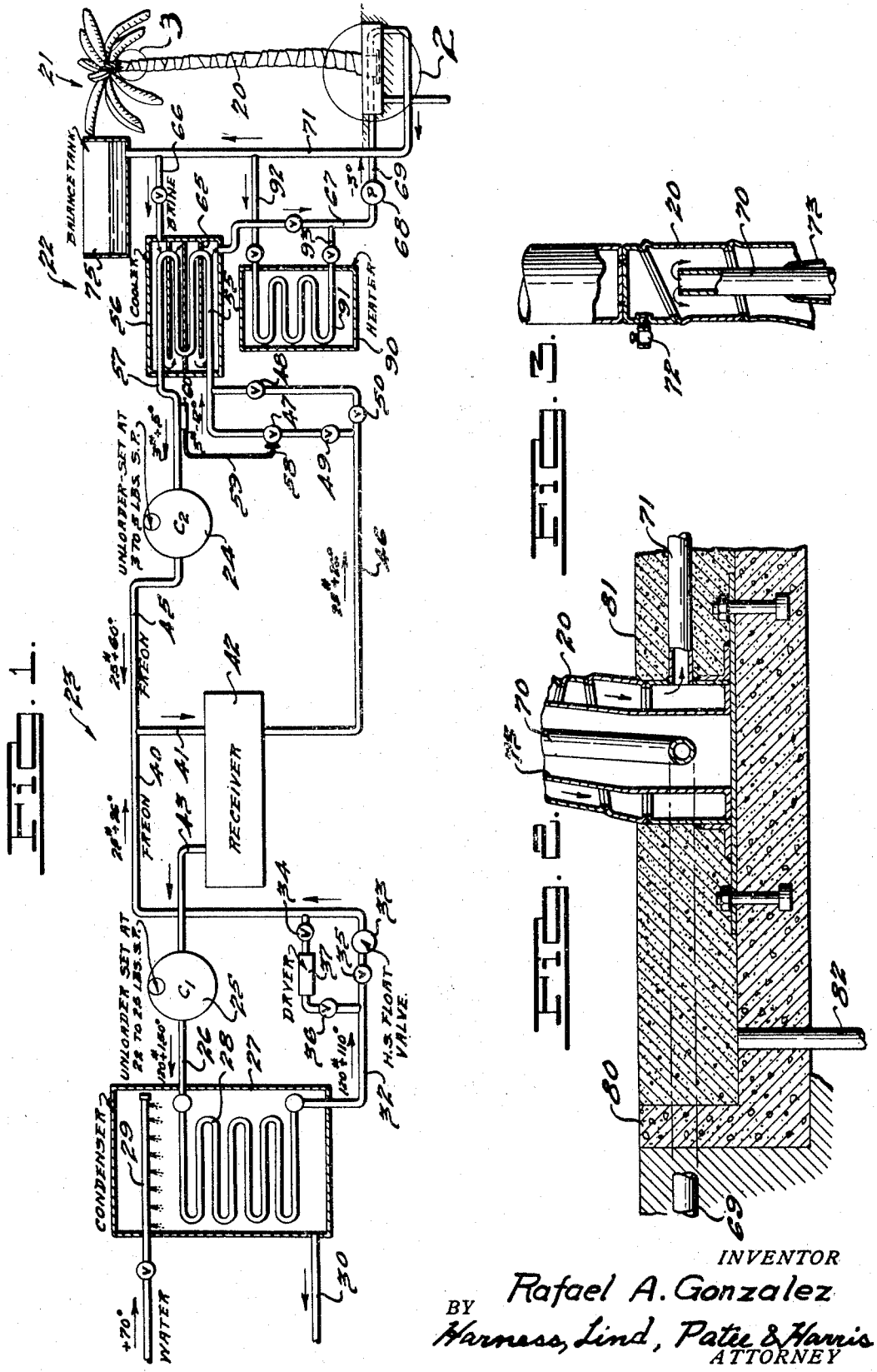

2,235,071

UNITED STATES PATENT OFFICE 2,235,071

METHOD AND APPARATUS FOR PRODUCING LOW TEMPERATURES AND FOR FROSTING THE SURFACES OF ARTISTIC CREATIONS

Rafael A. Gonzalez, Dayton, Ohio, assignor to Chrysler Corporation, Detroit, Mich., a corporation of Delaware Application May 24, 1939, Serial No. 275,442

9 Claims. (Cl. 62—115)

My present invention relates to a method and apparatus for frosting the surfaces of hollow bodies, the invention specifically comprising a method and apparatus for the utilization of a volatile refrigerant, such as dichloro-difluoro methane (Freon), to produce a very low temperature in a "brine" (which may be an actual salt solution, but which is preferably an organic compound capable of having its temperature lowered to a considerable extent below the freezing point of water without congealing, a preferred substance of this type being diethylene glycol), which is then used to chill the surfaces of artistic creations in an enclosure.

The function of the present invention is to maintain a low temperature on the surfaces of artistic creations or other low temperature apparatus by the use of refrigerants and chilling mediums of a non-inflammable, non-irritating, and non-toxic character so that the apparatus may be located in an enclosure without danger of explosion or loss of life if the refrigerant or chilling medium should escape from the system.

The principal object of the present invention is to provide a method and means of creating a coating of frost on an artistic creation in an enclosure where human beings congregate, in order to enhance the appearance of the enclosure and contribute to the well-being of human beings in the enclosure due to the condensation of atmospheric moisture in the form of frost on the surfaces of the artistic creations and the radiation of body heat from the human beings in the enclosure to the chilled surfaces of the artistic creations.

A further object of the present invention is to devise a method and apparatus for the production of intense cold by the use of a volatile refrigerant normally used at temperatures and pressures such as to be incapable of producing intense cold of the character required by artistic creations or other chilling apparatus of the type herein disclosed.

Other objects and the advantages of the present invention should be apparent from a study of the following specification taken in connection with the accompanying drawing wherein like numerals refer to like parts throughout.

Referring to the drawing,

Fig. 1 discloses in schematic fashion a system comprising two variable capacity compressors and connecting apparatus whereby brine circulated in an adjoining circulatory system may be chilled to a temperature below 0° F. without excessive power consumption and with the use of Freon refrigerant;

Fig. 2 is a partial section through a portion of the brine circulatory system illustrating details of the apparatus encircled at 2 in Fig. 1; and, Fig. 3 is a partial section through a portion of the brine circulatory apparatus showing details of the portion of the apparatus encircled at 3 in Fig. 1.

The present invention is specifically designed to chill the body or trunk portions 20 of artistic creations 21 which are preferably formed in accordance with the disclosure of my copending application, Serial No. 275,441, filed concurrently herewith, and used in an enclosure in the manner disclosed in the copending application of Raymond Loewy, Serial No. 275,477, filed concurrently herewith. The artistic creation 21 is connected by brine circulating pipes to a brine temperature altering system 22, which in turn is associated with a cooperating refrigerant circulating system 23 including compressors 24 and 25. The compressors 24 and 25 are preferably of the variable capacity type, preferably comprising a plurality of cylinders, each or any number of which may be unloaded in accordance with the disclosure of the copending application of Charles R. Neeson, Serial No. 177,694, filed December 2, 1937, now Patent No. 2,185,473, issued January 2, 1940, to which reference may be made for a more complete disclosure of the compressor and unloading means. Other types of variable capacity compressors may be used, it being a requirement of my invention only that the compressors comprise means whereby the volumetric capacity thereof should be automatically controlled in accordance with some function of the refrigerating load in order to maintain a desired temperature at an economical power input.

The refrigerating system 23 comprises a primary compressor 25 having its unloader mechanism set to operate at a relatively high range of pressures, such as represented by a suction pressure of 22 pounds to 25 pounds per square inch. The compressor discharges compressed gaseous refrigerant into a discharge pipe 26 leading to a condenser 27 comprising refrigerant tubes 28 and spraying means 29 such as a perforated pipe having water admitted thereto, and a drain connection 30 for the spent condensing water. Refrigerant which is condensed and cooled in the condenser passes through a liquid pipe 32 leading to expanding means, such as the high-side float valve 33 or the manual valve 34, either of which may be isolated by manipulation of manual valves 35 and 36 in the branches of a loop connection. Preferably, the liquid is automatically expanded through the high-side float valve 33, but the manual valve 34 may be used intermittently in order to pass the refrigerant through a drier 37 from time to time whereby to remove traces of water from the system in order to prevent clogging of the system by accumulations of ice. From the expansion means the refrigerant, which now is a mixture of gas and liquid, passes through a pipe 40 leading to a pipe 41 which opens into the top of a closed vessel or receiver 42. Liquid which enters the receiver settles to the bottom of the receiver, and gas which collects at the top of the receiver is drawn off through the suction inlet pipe 43 of compressor 25 to be recompressed, condensed, and expanded. As fast as the compressor reduces the pressure in the receiver, more of the liquid refrigerant will volatilize and pass into the compressor.

Pipe 41 not only joins pipe 40, but also joins a pipe 45 comprising the discharge outlet for the secondary compressor 24, which preferably has its unloader set at a relatively low pressure such as 3 to 5 pounds per square inch. Refrigerant which is compressed by the secondary compressor 24 mingles with the refrigerant escaping through the expansion valve of the primary system while entering pipe 41 and the receiver 42, thereby having its temperature reduced by the refrigerating effect of the primary system, as well as by the expansion of a portion thereof to form gas in the receiver 42. The body of liquid refrigerant which thus forms in the bottom of the receiver 42 may enter the secondary liquid line 46 which leads to an automatic expansion valve 47 or a manual expansion valve 48 located in the arms of a loop connection, either valve being selected by operation of manual valves 49 and 50. The refrigerant passing the expansion means enters a brine chilling coil 55 located in brine cooler 56 and thereafter enters the secondary compressor 24 through its suction inlet pipe 57. When the automatic expansion valve 48 is used, it is preferably automatically controlled to maintain a constant superheat in the suction gas by the usual valve motor 58 connected by tube 59 to a thermal-bulb 60 attached to the surface of suction pipe 57.

Although the previously described system may be used with other refrigerants, I prefer the use of Freon (dichloro-difluoro-methane) because of its harmless character and low pressures at the desired temperatures. In the preferred operation of the system the primary compressor 25 discharges Freon at a pressure of approximately 120 pounds and superheated to a temperature of approximately 150° F. The cooling water, which may be at 70° F. or any other temperature within a reasonable range thereof, causes condensation of the gas and cooling of the resulting liquid so that the refrigerant approaches the expansion valve at approximately 120 pounds and 110° F. The expansion means of the primary system is preferably set so that the refrigerant in pipe 40, receiver 42, and suction inlet 43 is at 25 pounds and 26° F. The unloader of the primary compressor 25 is preferably set to operate at a range of 22 pounds to 25 pounds suction pressure so that the capacity of the compressor will be automatically varied in order to maintain a pressure of approximately 25 pounds in the receiver 42. Since pipe 40 is connected to the discharge pipe 45 of the secondary compressor 24, the discharge pressure of the secondary compressor 24 will be the same as the suction pressure of the primary compressor 25. The refrigerant is therefore discharged from the secondary compressor 24 at 25 pounds and approximately 60° F., but the liquid in receiver 42, formed partially by refrigerant from the primary compressor 25 and partially by refrigerant from the secondary compressor 24, while maintained at a pressure of 25 pounds will be cooled to approximately 26° F. The refrigerant passing the secondary expansion means and entering the cooling coils in the brine cooler 56 will be at a pressure of approximately 3 pounds, and since the refrigerant is saturated at the entering point, it will have a temperature of approximately −12° F. After performing the work of cooling the brine in the brine cooler 56, the refrigerant will be superheated and will leave the brine cooler at a pressure of approximately 3 pounds but at a superheated temperature of preferably 5° F. The expansion valve 47 should be so adjusted as to maintain this difference of approximately 17° F., but any other temperature differential may be selected in accordance with good refrigerating practice. Similarly, if the hand valve 48 is used for an expansion means the operator may set the valve at any desired point so as to produce a desired temperature at the outlet of the cooler.

The brine cooler preferably comprises a cooler of the refrigerant-tube type in order that freezing of the brine may occur without harmful effect, and preferably comprises a plurality of baffles 65 directing the brine in a direction contrary to the flow of refrigerant through the tubes 55. The brine preferably enters through an inlet pipe 66 and leaves through a pipe 67 forming the inlet to a pump 68. The outlet 69 of the pump connects with a riser 70 leading upward in the hollow interior of the portion of the artistic creation 21 to be frosted. As set forth in my copending application Serial No. 275,441, filed concurrently herewith, the riser 70 communicates with the interior space of the shell 20 adjacent the top thereof, and the brine fills the interior of the shell and leaves the shell through a connecting pipe 71. A vent cock 72 may be provided at the top of the interior of the shell in order to permit the escape of air trapped therein when the brine is being admitted, and an inner shell 73 may be provided in order to reduce the interior space to be filled by brine and to brace the riser pipe 70. The connecting pipe 71 joins the outlet of the tree to the brine cooler inlet 66 and continues into the bottom of an open balance tank 75 having its midpoint on a level with the vent cock 72 in order that the pump may operate against a constant head.

The brine, when chilled by refrigerant at approximately the temperatures previously set forth, will enter the interior of the artistic creation at a temperature of substantially −3° F., which temperature is sufficiently below the freezing temperature of water to cause the condensation of atmospheric water vapor on the surface of the shell 20 in the form of frost, thus creating an attractive surface thereon and also chilling the surface of the artistic creation to such an extent as to cause body heat of nearby human beings to radiate thereto.

The artistic creation is preferably mounted in a well 80 filled with a filler of pebbles 81, or other weight-sustaining, porous filler which will permit the rapid escape of water therethrough, in order that the artistic creation may be defrosted without flooding the surrounding area. A drain pipe 82 is preferably provided in order to permit the withdrawal of water formed from melted frost to some convenient place of disposal, and the frosted surfaces may be conveniently defrosted by the simple process of stopping the circulation of the refrigerant and brine, or by stopping the circulation of the refrigerant and continuing circulation of the brine through the cooler and the artistic creation. However, if it is desired to defrost rapidly, the brine may be circulated through a heater 90 having any convenient source of heat therein or connected thereto and comprising brine coils 91 having an inlet 92 connected to connecting pipe 71 and an outlet 93 connected to the pump inlet 67. Either the heater or the cooler may be isolated from the remainder of the brine circulating system by conveniently placed manual valves.

Having described a preferred arrangement of my invention, it should be readily apparent to those skilled in the art that the same permits of modifications in arrangement and detail thereof. All such modifications as come within the scope of the following claims are considered to be a part of my invention.

I claim:

1. A system for chilling the surfaces of hollow bodies comprising a brine circulating system including a brine cooler and means for circulating a brine through the interior of the hollow body and said brine cooler; and a refrigerating system for cooling the brine passing through said brine cooler comprising a primary refrigerant compressor-condenser-expander system including a compressor comprising unloading means set to maintain a substantially constant, relatively high suction pressure, and a secondary refrigerant compressor-condenser-expander system connected thereto, of which the condensing means comprises the expanding means of said primary system and of which the expanding means is so constructed and arranged as to chill the brine in said brine circulating system including a compressor comprising unloading means set to maintain a substantially constant, relatively low suction pressure.

2. The process of chilling a brine for use as a chilling medium for hollow bodies through which the brine is circulated comprising compressing a volatile refrigerant at a relatively high pressure and temperature, condensing said refrigerant, expanding said refrigerant into a closed vessel, withdrawing gaseous refrigerant from the upper part of said closed vessel to lower the temperature therein, withdrawing liquid refrigerant from the lower part of said closed vessel at the lowered temperature achieved therein, expanding said withdrawn liquid refrigerant to cool said brine, compressing the expanded refrigerant after it has cooled said brine and discharging such compressed refrigerant into said vessel.

3. A refrigerating system for producing relatively low temperatures by the use of a refrigerant normally incapable of producing such low temperatures, comprising a primary compressor-condenser-expander system including a compressor comprising unloading means set to maintain a substantially constant, relatively high suction pressure, and a secondary compressor-condenser-expander system connected thereto, of which the condensing means comprises the expanding means of said primary system, and of which the compressor comprises unloading means set to maintain a substantially constant, relatively low suction pressure.

4. A refrigerating system for producing relatively low temperatures by the use of a refrigerant normally incapable of producing such low temperatures, comprising a primary compressor-condenser-expander system including a compressor comprising unloading means set to maintain a substantially constant, relatively high suction pressure and of which the expander comprises a closed vessel, and a secondary refrigerant compressor-condenser-expander system connected thereto comprising connections whereby refrigerant compressed in said secondary system is passed into said closed vessel and whereby liquid refrigerant is drawn from said closed vessel and expanded in the expander of said secondary system.

5. A refrigerating system for producing relatively low temperatures by the use of a refrigerant normally incapable of producing such low temperatures, comprising a primary compressor-condenser-expander system including a compressor comprising unloading means set to maintain a substantially constant, relatively high suction pressure and of which the expander comprises a closed vessel, and a secondary refrigerant compressor-condenser-expander system connected thereto comprising connections whereby refrigerant compressed in said secondary system is passed into said closed vessel and whereby liquid refrigerant is drawn from said closed vessel and expanded in the expander of said secondary system, the compressor of said secondary system comprising unloading means set to maintain a substantially constant, relatively low suction pressure.

6. A refrigerating system for producing relatively low temperatures by the use of a refrigerant normally incapable of producing such low temperatures, comprising a closed vessel, a primary compressor-condenser-expander system of which the expander is said closed vessel and of which the compressor comprises unloading means set to maintain a substantially constant, relatively high suction pressure and which draws expanded refrigerant at said substantially constant, relatively high suction pressure from said closed vessel, and a secondary refrigerant compressor-condenser-expander system of which the condenser is said closed vessel.

7. A refrigerating system for producing relatively low temperatures by the use of a refrigerant normally incapable of producing such low temperatures, comprising a closed vessel, a primary compressor-condenser-expander system of which the expander is said closed vessel and of which the compressor comprises unloading means set to maintain a substantially constant, relatively high suction pressure and which draws expanded refrigerant at said substantially constant, relatively high suction pressure from said closed vessel, and a secondary refrigerant compressor-condenser-expander system of which the condenser is said closed vessel and of which the compressor comprises unloading means set to maintain a substantially constant, relatively low suction pressure whereby a relatively low temperature is maintained in the expander of said secondary refrigerant compressor-condenser-expander system.

8. A system for frosting the surface of a hollow body by the use of dichloro-difluoro-methane which is normally incapable of producing a temperature of 0° F., comprising a closed vessel, a primary compressor-condenser-expander system, using dichloro-difluoro-methane as the refrigerant, of which the expander is said closed vessel and of which the compressor comprises unloading means set to maintain a substantially constant, relatively high suction pressure of approximately 25 pounds per square inch and which draws expanded refrigerant at said substantially constant, relatively high suction pressure from said closed vessel, a secondary refrigerant compressor-condenser-expander system, using the same dichloro-difluoro-methane as the refrigerant, of which the condenser is said closed vessel and of which the compressor comprises unloading means set to maintain a substantially constant, relatively low suction pressure of approximately 3 pounds per square inch whereby a relatively low temperature of approximately −12° F. is maintained in the expander of said secondary refrigerant compressor-condenser-expander system, and a brine circulating system including said hollow body and means to pass the brine in said brine circulating system in heat transferring relation with the dichloro-difluoro-methane in the expander of said secondary refrigerant compressor-condenser-expander system whereby the brine passes through said hollow body at a temperature well below the freezing temperature of water and close to 0° F.

9. The process of chilling a liquid for use as a chilling medium for hollow bodies through which the liquid is circulated comprising compressing a volatile refrigerant at a relatively high pressure and temperature, condensing said refrigerant, expanding said refrigerant into a closed vessel, withdrawing gaseous refrigerant from the upper part of said closed vessel to lower the temperature therein and recirculating such withdrawn refrigerant through the steps of compression at said relatively high pressure and temperature, condensation and discharge into said closed vessel, withdrawing liquid refrigerant from the lower part of said closed vessel at the lowered temperature achieved therein, expanding said withdrawn liquid refrigerant to cool said liquid, compressing the expanded refrigerant after it has cooled said liquid and discharging such compressed refrigerant into said vessel to be condensed therein by the expansion of refrigerant therein.

RAFAEL A. GONZALEZ.